(12) United States Patent
Dixon et al.

(10) Patent No.: US 9,689,374 B2
(45) Date of Patent: Jun. 27, 2017

(54) METHOD AND APPARATUS FOR REDUCTION OF FATIGUE AND GUST LOADS ON WIND TURBINE BLADES

(71) Applicant: Siemens Aktiengesellschaft, Munich (DE)

(72) Inventors: Kristian R. Dixon, Boulder, CO (US); Edward A. Mayda, Thornton, CO (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 314 days.

(21) Appl. No.: 14/561,309

(22) Filed: Dec. 5, 2014

(65) Prior Publication Data

US 2015/0098820 A1   Apr. 9, 2015

Related U.S. Application Data

(63) Continuation-in-part of application No. 14/164,879, filed on Jan. 27, 2014, and a continuation-in-part of application No. PCT/US2013/064060, filed on Oct. 9, 2013.

(51) Int. Cl.
*F03D 7/02* (2006.01)
*F03D 1/06* (2006.01)

(52) U.S. Cl.
CPC ......... *F03D 7/0224* (2013.01); *F03D 1/0633* (2013.01); *F03D 1/0675* (2013.01); *F03D 7/0232* (2013.01); *F05B 2240/31* (2013.01); *Y02E 10/721* (2013.01); *Y02E 10/723* (2013.01)

(58) Field of Classification Search
CPC .... F03D 1/0633; F03D 7/0224; F03D 7/0232; F03D 7/0256; F03D 1/0675; Y02E 10/721; Y02E 10/723; F05B 2240/31; F05B 2260/76; F05B 2260/78
See application file for complete search history.

(56) References Cited

U.S. PATENT DOCUMENTS

| | | |
|---|---|---|
| 3,282,535 A | 11/1966 | Steiner |
| 3,831,886 A | 8/1974 | Burdges et al. |
| 4,082,479 A | 4/1978 | Rangi et al. |
| 4,202,519 A | 5/1980 | Fletcher |
| 4,227,665 A | 10/1980 | Carson et al. |
| 4,293,110 A | 10/1981 | Middleton et al. |
| 4,399,970 A | 8/1983 | Evans |
| 4,427,168 A | 1/1984 | McKinney et al. |
| 4,462,753 A | 7/1984 | Harner et al. |

(Continued)

FOREIGN PATENT DOCUMENTS

| | | | |
|---|---|---|---|
| EP | 2778401 A2 | 3/2014 | |
| WO | WO 9404820 A1 * | 3/1994 | ........... F03D 7/0236 |
| WO | 2004088130 A1 | 10/2004 | |

*Primary Examiner* — Kenneth Bomberg
*Assistant Examiner* — Jesse Prager (57) ABSTRACT

An adjustable lift regulating device (30, 32, 40, 50, 52, 56, 60, 68, 72, 76) on an inboard portion of a wind turbine blade (28). The lift regulating device is activated to reduce lift on the inboard portion of the blade by causing flow separation (41) on the suction side (22) of the blade. To compensate for the lost lift, the blade pitch is increased to a running pitch that facilitates stalling on the outer portion of the blade in gusts. This provides passive reduction of fatigue and extreme loads from gusts while allowing full power production under non-gust conditions.

6 Claims, 6 Drawing Sheets

(56) References Cited

U.S. PATENT DOCUMENTS

| | | | |
|---|---|---|---|
| 4,553,721 A | 11/1985 | Jorgensen | |
| 5,058,837 A | 10/1991 | Wheeler | |
| 5,253,828 A | 10/1993 | Cox | |
| 5,681,013 A | 10/1997 | Rudolph | |
| 6,427,948 B1 | 8/2002 | Campbell | |
| 7,878,457 B2 | 2/2011 | Narramore | |
| 7,891,611 B2 | 2/2011 | Huynh et al. | |
| 7,900,871 B2 | 3/2011 | Rincker et al. | |
| 8,083,491 B2 * | 12/2011 | Garcillan Rueda | F03D 1/0641 415/115 |
| 8,192,161 B2 | 6/2012 | Baker et al. | |
| 8,256,720 B2 | 9/2012 | Ikeda | |
| 8,267,654 B2 * | 9/2012 | van Dam | F03D 1/06 416/14 |
| 8,276,852 B2 | 10/2012 | Shmilovich et al. | |
| 8,602,739 B2 | 12/2013 | Enevoldsen et al. | |
| 2008/0317598 A1 | 12/2008 | Barbu et al. | |
| 2009/0185901 A1 * | 7/2009 | Nielsen | F03D 7/0224 416/1 |
| 2010/0143152 A1 | 6/2010 | Subramanian et al. | |
| 2011/0250076 A1 | 10/2011 | Fuglsang et al. | |
| 2012/0049001 A1 | 3/2012 | Smith et al. | |
| 2012/0070281 A1 * | 3/2012 | Fuglsang | F03D 1/0641 416/1 |
| 2012/0141271 A1 | 6/2012 | Southwick | |
| 2015/0030449 A1 * | 1/2015 | Betran Palomas | F03D 7/0224 416/1 |

* cited by examiner

FIG 14

METHOD AND APPARATUS FOR REDUCTION OF FATIGUE AND GUST LOADS ON WIND TURBINE BLADES

This application is a continuation-in-part of U.S. patent application Ser. No. 14/164,879 filed on 27 Jan. 2014 and international patent application number PCT/US2013/064060 filed on 9 Oct. 2013, both of which are incorporated herein by reference.

FIELD OF THE INVENTION

This invention relates generally to the field of wind turbines, and more specifically to methods and apparatus for reducing cyclic fatigue and extreme loads on wind turbine blades.

BACKGROUND OF THE INVENTION

Wind turbines can encounter excess wind speeds beyond their structural design capacity or beyond what is needed for maximum rated power output. The "rated wind speed" of a wind turbine is the lowest wind speed at which it produces power at its rated capacity. Damaging blade loads can be sustained above this rated wind speed in what is called the 'post-rated' regime, typically 12-25 m/s or 15-20 m/s for example, depending on the turbine. To maximize efficiency before reaching rated power and to regulate power to a fixed level above rated wind speed, the turbine varies the blade pitch depending on torque/power output. Beyond the safe operating wind speed, the blades are feathered, and the rotor may be stopped or idled.

Figure 1:
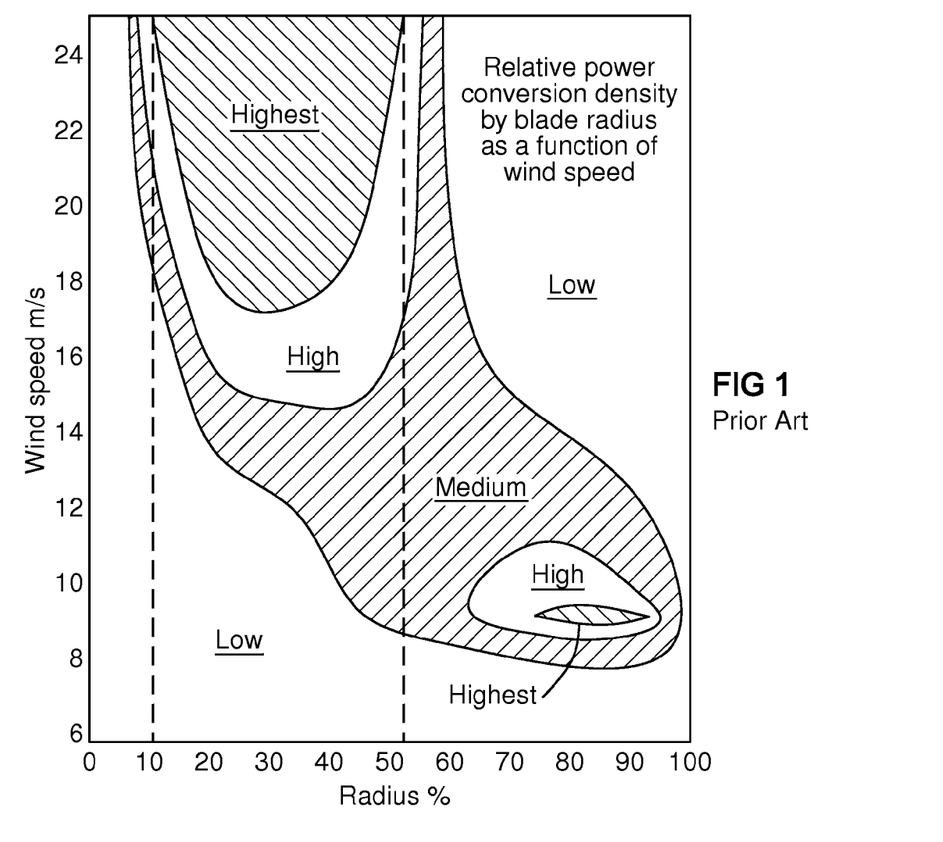
FIG. 1 illustrates the relative density of power conversion by radius on a conventional wind turbine blade as a function of wind speed.

To maintain power production in the post-rated wind speed regime, the blade is pitched progressively towards feather with increasing wind speed. As a result, the outboard parts of the blade may have a near zero or negative angle of attack, at which they are at or near idle or are in a negative lift or "braking" state. In such conditions, most or all of the rotor torque is generated by inboard parts of the blade (FIG. 1).

Figure 2:
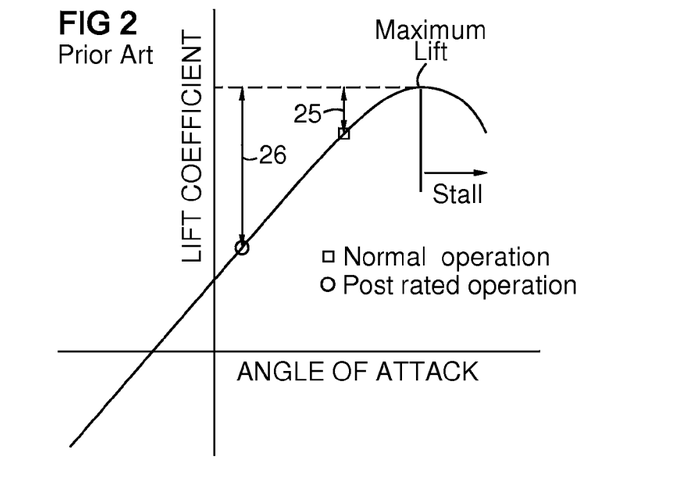
FIG. 2 illustrates the lift coefficient of a conventional wind turbine blade as a function of angle of attack.

When operating at rated wind speed or less, the blade pitch is set for an angle of attack that maximizes power production and is associated with lift being generated at all blade radial positions. A sudden gust increases the angle of attack to a stall condition that reduces lift temporarily, thus protecting the blade from lift overloads and rapid load changes. However in the post-rated wind configuration with zero or negative angle of attack on parts of the blade, this natural load alleviation mechanism is reduced because the outboard blade sections are operating far from stall. In this configuration, a gust initially increases the angle of attack toward maximum lift, causing a large and rapid load increase on the outer portion of the blade, leading to higher amplitude fatigue load cycles. FIG. 2 illustrates that a relatively small increase in lift coefficient 25 causes stalling in normal operation compared to a larger increase 26 needed to stall at a low angle of attack as conventionally used in high winds.

BRIEF DESCRIPTION OF THE DRAWINGS

The invention is explained in the following description in view of the drawings that show.

DETAILED DESCRIPTION OF THE INVENTION

The inventors devised a method for reducing fatigue and extreme loads on a wind turbine in strong gusty winds by 1) increasing airflow separation on an inboard part of the blades, thus reducing lift during a steady state airflow; 2) increasing blade, pitch to restore the reduced lift during the steady state airflow, thus moving the angle of attack closer to the point of maximum lift and enhancing a stall response to gusts on the outboard portion of the blades. This allows the outboard blade portion to safely provide power in high winds, because it stalls in gusts that increase the angle of attack beyond its stall angle, thus unloading it. The angle of attack of an operating wind turbine blade is a function of the pitch angle of the blade, the rotational speed of the turbine, and the wind speed. When the wind speed increases as a result of a gust of wind, the angle of attack increases. A lift regulating device (or lift regulator) other than pitch is installed on the inboard blade portion, and is activated to reduce lift responsive to wind condition indicators such as wind speed and variability, blade pitch, and blade loading. After or during activating the lift regulator, the blade pitch is increased to restore the lift, thus increasing the angle of attack, and making the stall response more rapid because the blade is operating closer to the stall point on the outboard sections than it would operate without activation of the lift regulator. A gust that increases the angle of attack is more quickly unloaded because stall occurs sooner than in the prior art position. This reduces fatigue and extreme loads, especially when operating beyond rated wind speed. The method is enabled by various embodiments of the lift regulation device herein. Any embodiment may be activated in proportion to the wind condition. The lift regulating device may be a slow-acting device, thus minimizing activation stress and actuator power requirements. Alternately, activation of the lift regulating device may be delayed so as to take at least 5 or 10 times longer than the pitch response to avoid feedback between the two. Alternately, activation may be delayed by at least 5 or more seconds.

FIG. 1 shows the relative density of power conversion along a blade radius as a function and wind speed. Contours illustrating low, medium, high, and highest power densities are shown. The highest power density in high winds occurs along the inboard 10-50% of the blade as shown by dashed lines in this example. In high winds the outboard portion of the blade is feathered to near zero or negative pitch. It experiences high load changes when gusts suddenly increase the angle of attack toward maximum lift. The inventors recognized that if the inboard power is reduced, the blade pitch can be increased to move the outboard portion away from the feathered position and to cause stalls on the outer blade in gusts that increase the angle of attack.

FIG. 2 shows the lift coefficient of a wind turbine blade as a function of angle of attack. Gusts can quickly and repeatedly increase both the wind speed and angle of attack. Cyclic fatigue and extreme stresses are avoided during normal operation with a normal running pitch because a gust causes a stall after a small increase in lift 25. During post-rated (high wind) operation, the angle of attack is reduced to a first post-rated or more feathered pitch to reduce lift. However, this enables a greater increase in lift 26 before stall occurs, which causes frequent peaks and valleys in aerodynamic loads, causing fatigue. The method and apparatus herein increases the angle of attack to a second post-rated pitch greater than the first post-rated pitch during post-rated operation, thus protecting the blade from cyclic stress via a rapid stall response during gusts.

Figure 3:
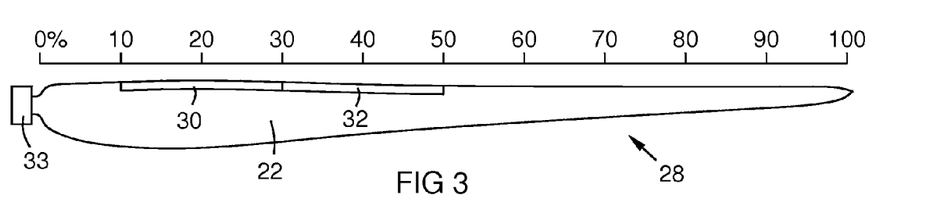
FIG. 3 is a suction side view of a wind turbine blade with lift regulating devices on an inboard portion of the blade.

FIG. 3 shows a suction side 22 of a wind turbine blade 28 with one or more lift regulating devices 30, 32 along one or more inboard portions of the blade, such as along the inboard 20% to 50% of the blade in some embodiments. A pitch controller 33 operates as described herein. The outboard portion of the blade, for example the outboard 50% to 80% in some embodiments, may be without such lift regulators.

Figure 4:
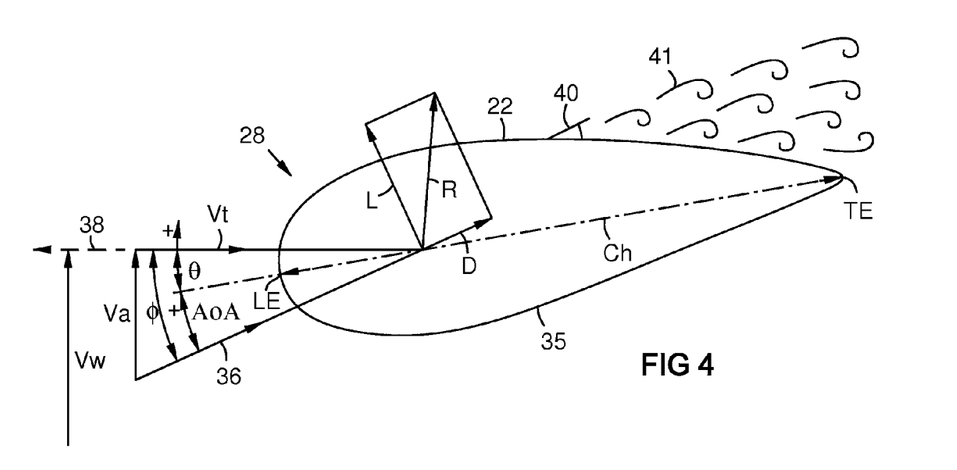
FIG. 4 is a transverse sectional profile of a wind turbine blade airfoil with a suction side spoiler.

FIG. 4 shows a transverse sectional profile of a wind turbine blade 28 with a pressure side 35 and a suction side 22. A chord line Ch spans between the leading edge LE and the trailing edge TE. The length of the chord line Ch is the airfoil chord length. Vector Vw represents the wind velocity outside the influence of the rotor. An axial free-stream vector Va represents the axial component of the air inflow at the blade 20 after reduction of the wind velocity Vw by an axial induction factor as known in the art. "Axial" herein means parallel with the turbine rotor axis (not shown). Combining Vs with a tangential velocity component Vt gives a relative wind vector 36 at an angle φ relative to the rotation plane 38 of the rotor. The angle of attack AoA is the angle between the relative wind vector 36 and the chord line Ch. The absolute pitch angle θ is the angle between the chord line Ch and the rotation plane 38. Positive pitch (+) and positive angle of attack (+) are clockwise in this view, so increasing pitch by rotation of the leading edge LE toward the suction side 22, increases the angle of attack AoA. The lift vector L is perpendicular to the relative inflow vector 36. The drag vector D is directed aft parallel to the relative wind vector 36. The resultant load vector R of lift and drag is shown.

An inboard lift regulator may be embodied as a suction side spoiler 40 that causes flow separation 41 when deployed. The spoiler may be a hinged plate as shown, and may be actuated by known means such as hydraulics or electric motors. Flow separation reduces 41 lift.

Figure 5:
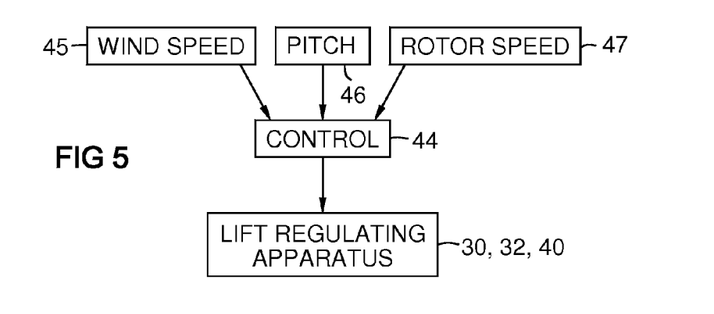
FIG. 5 is a system chart showing a control unit that activates a lift regulator responsive to a wind condition.

FIG. 5 shows a system with a control logic unit 44 and exemplary inputs of wind speed 45, blade pitch 46, and rotor speed 47, which may be used to analyze wind conditions and compare them to one or more limits that determine when to activate a lift regulator. For example, the lift regulator may be activated when the wind reaches or exceeds a predetermined condition such as a combination of wind speed and variability. Wind variability may be derived for example from instantaneous changes in wind speed or by derived metrics such as statistical variance, or higher order wind speed derivatives. Alternately, secondary indicators of the wind condition may be used such as aerodynamic loading, rotor speed, or a minimum blade pitch when pitch is reduced in high winds.

Figures 6, 7:
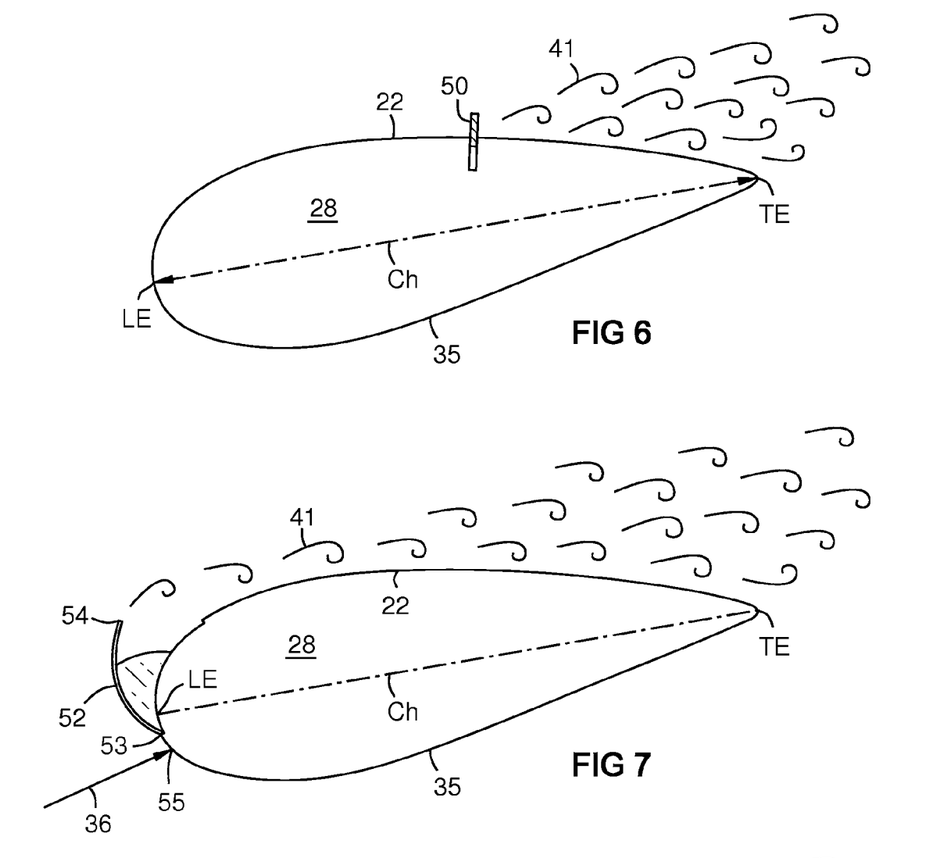
FIG. 6 shows a spoiler extending linearly from a suction side inboard portion of a wind turbine blade.
FIG. 7 shows a leading edge shell pivoting from the bottom edge thereof to cause flow separation on the suction side of the blade.

FIG. 6 shows a lift regulator embodied as a suction side spoiler 50 that extends linearly along the suction side 22 on an inboard portion of the blade, and causes flow separation 41 when deployed.

FIG. 7 shows a lift regulator embodied as a leading edge shell 52 hinged along a bottom edge 53 thereof below the blade leading edge LE. It has a distal edge 54 that extends forward and outward from the airfoil to a deployed position above the leading edge LE. This configuration causes reliable flow separation 41 all along the suction side 22. In the retracted position, the shell may be flush with the airfoil. It can optionally wrap far enough around the leading edge to serve as a replaceable shield against damage from hail and bird strikes. This can be done by placing the hinge point 53 below a stagnation zone 55 of the impinging relative wind 36.

Figure 8:
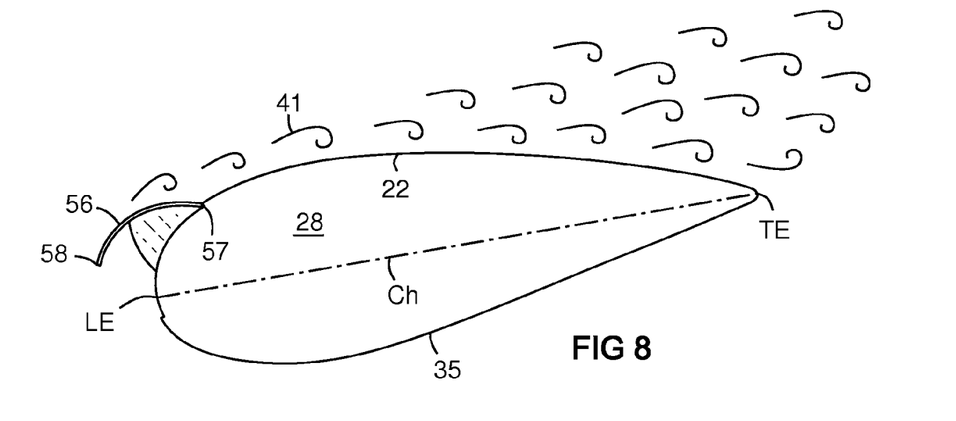
FIG. 8 shows a leading edge shell pivoting from the top edge thereof to cause flow separation on the suction side of the blade.

FIG. 8 shows a lift regulator embodied as a leading edge shell 56 hinged along a top edge 57 thereof above the blade leading edge LE. It has a distal edge 58 that separates from below the leading edge, and pivots upward to a deployed position forward of and above the leading edge LE. This configuration causes reliable flow separation 41 all along the suction side 22.

Figures 9, 10:
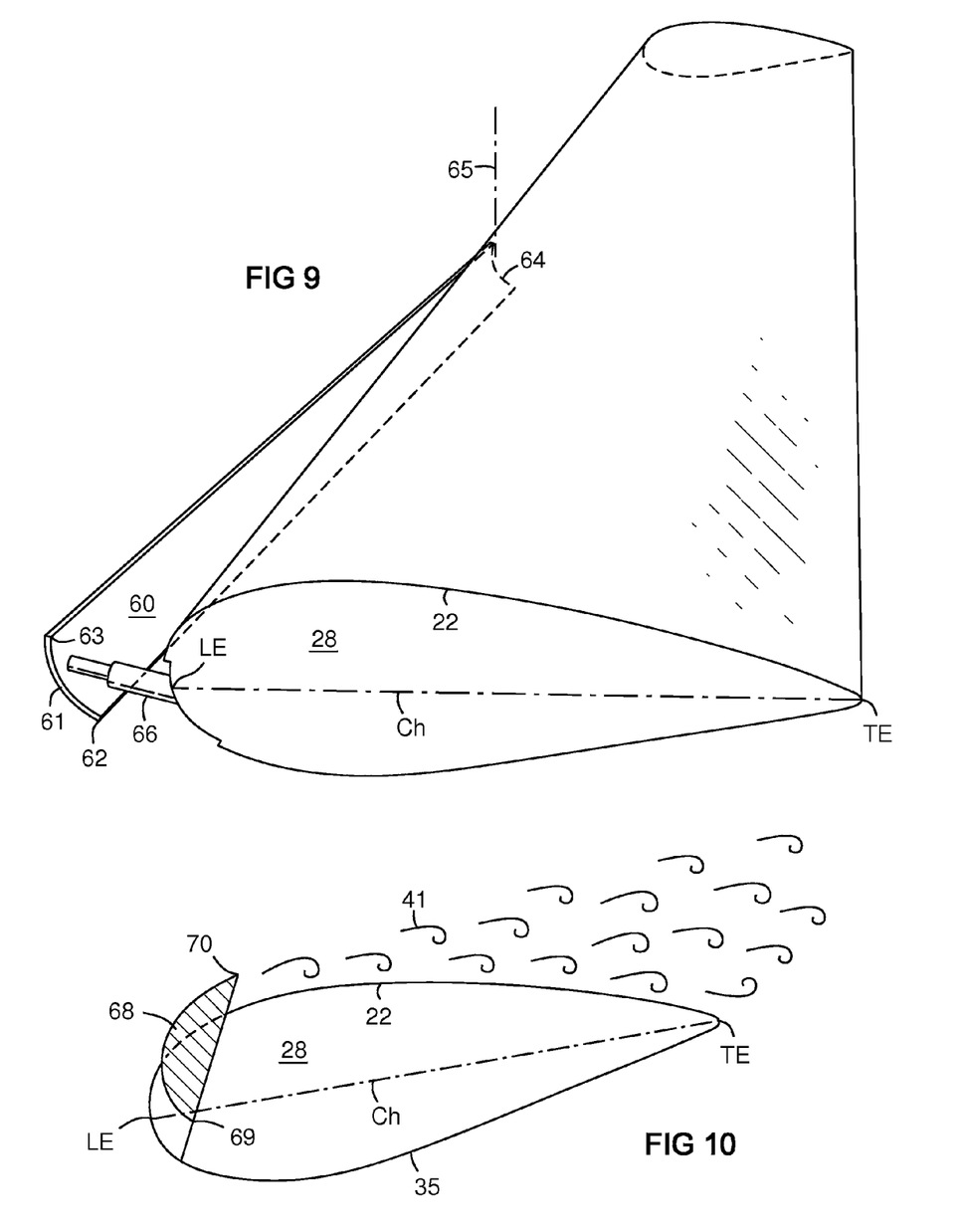
FIG. 9 shows a leading edge shell pivoting from an outboard end thereof to cause flow separation on the suction side of the blade.
FIG. 10 shows a sliding front section of the blade that slides upward causing flow separation on the suction side of the blade.

FIG. 9 shows a lift regulator embodied as a leading edge shell 60 with a radially inboard end 61, a lower edge 62, an upper edge 63, and a radially outboard end 64. The outboard end may pivot on an axis 63 that separates the inboard end 62 from the leading edge LE. This provides a gradient of lift reduction—greater reduction at the inboard end and less reduction at the outboard end of the shell 60. An actuator 66 such as a hydraulic piston may be close to the rotor hub for short hydraulic lines. The upper edge 63 may deploy to a position forward and above the leading edge LE. The lower edge 62 may deploy to a position below the leading edge LE of the blade and aft of the upper edge 63 of the shell. This configuration causes reliable flow separation all along the suction side 22 proportional to the degree of separation of the shell 60 from the leading edge.

FIG. 10 shows a lift regulator embodied as a sliding front section 68 of the blade 28, that slides upward to extend above the suction side 22, and retracts flush with the blade airfoil. The lower edge 69 of the sliding section may retract to a position below the leading edge LE. The upper edge 70 of the sliding section may extend above the suction side 22. This configuration causes reliable flow separation 41 all along the suction side 22.

Figure 11:
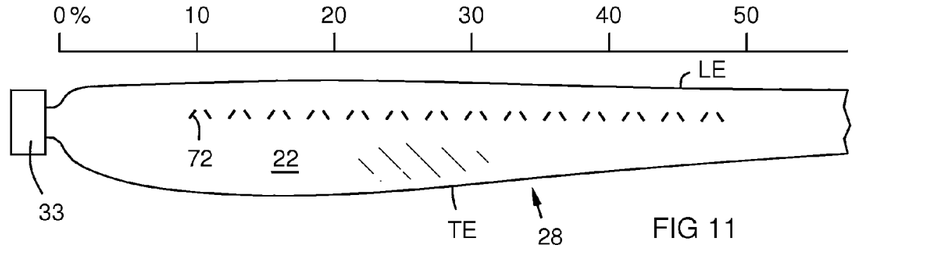
FIG. 11 is a suction side view of a row of vortex generators configured to enhance lift.

FIG. 11 shows a lift regulator embodied as a row of vortex generators 72 that are rotatable between a lift enhancing and/or separation delay configuration and a spoiler configuration. In the lift enhancing position of FIG. 11, they create vortices that pull free stream energy into the boundary layer.

Figure 12:
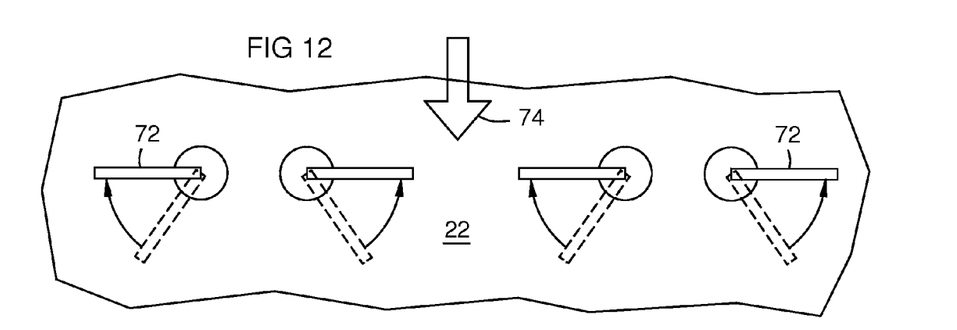
FIG. 12 shows the vortex generators of FIG. 11 rotated into a spoiler position.
Figure 13:
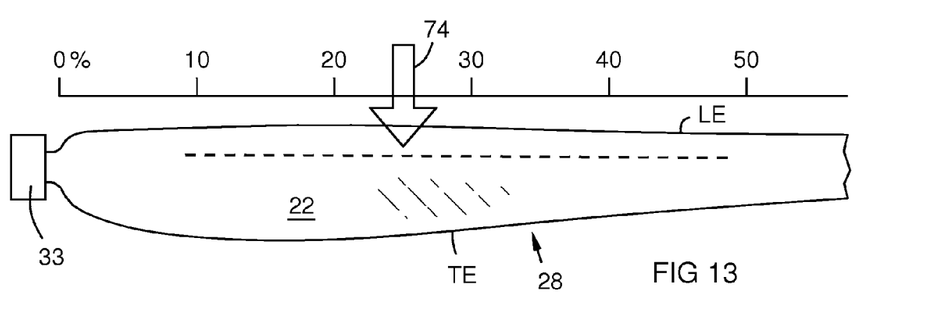
FIG. 13 shows the row of vortex generators of FIG. 11 rotated perpendicular to the airflow in the spoiler position along an inboard portion of the blade.

This reduces flow separation on the suction side 22 of the blade 28 as known in the art, increasing lift. FIG. 12 shows the vortex generators 72 rotated into a spoiler position perpendicular to the airflow 74, which causes flow separation. Rotation may be done by actuators such as piezoelectric, electric motor, pneumatics or hydraulics. FIG. 13 shows the row of vortex generators perpendicular to the airflow in the spoiler position along an inboard portion of the blade.

Figure 14:
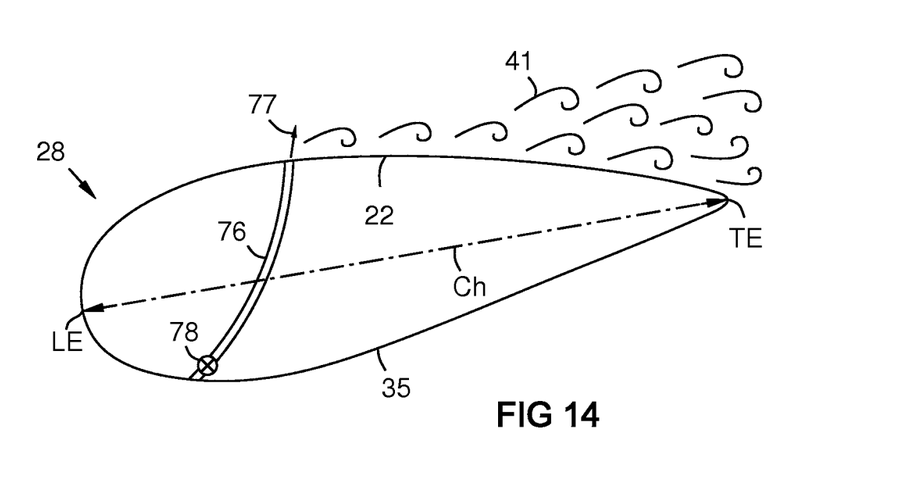
FIG. 14 shows a tube that transfers air from the pressure side to the suction side, ejecting a jet on the suction side that causes flow separation there.

FIG. 14 shows a lift regulator embodied as a tube 76 that transfers air from the pressure side 35 to the suction side 22, ejecting an air jet 77 on the suction side when a valve 78 is opened. The tube may start at or near the highest pressure point on the pressure side.

The method and apparatus herein enable longer blade designs by reducing cyclic fatigue and extreme loads, which may enable larger rotors to be placed on the same nacelle/drivetrain. Longer blades provide higher annual energy production. The invention also reduces wear on the blade pitch system by eliminating the need for continuous fast pitch responses in high winds. The increased angle of attack causes local stalling that unloads each gust without the need for a fast mechanical response.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method for operating a wind turbine, comprising:
providing an adjustable lift regulating device other than pitch on an inboard portion of a wind turbine blade;
reducing lift on the inboard portion of the blade at a first pitch of the blade by activating the lift regulating device responsive to a wind condition;
increasing the pitch of the blade to a second pitch greater than the first pitch to regain the reduced lift, wherein the second pitch facilitates stalling of an outer portion of the blade in a gust that increases an angle of attack thereof;
wherein the adjustable lift regulating device comprises a leading edge shell comprising a bottom edge hinged to the blade below a leading edge of the blade; and
the activating comprises pivoting a top edge of the lift regulating device forward and away from the blade to a position forward and above the leading edge of the blade.

2. The method of claim 1, further comprising determining the wind condition as a function of wind speed and wind speed variability.

3. The method of claim 2, further comprising delaying the activating for a time period greater than a short period variability of the wind speed.

4. The method of claim 1, wherein the first pitch is a first post rated pitch, and further comprising reducing the pitch of the blade from a running pitch to the first post rated pitch responsive to the wind condition, and activating the lift regulating device responsive to reaching the first post rated pitch.

5. An apparatus for a wind turbine, comprising
a control unit that determines a wind condition; and
an adjustable lift regulating device other than pitch on an inboard portion of a wind turbine blade, wherein an activation of the lift regulating device reduces a lift coefficient on the inboard portion of the blade;
wherein the control unit is operable to activate the lift regulating device responsive to the wind condition at a first pitch of the blade, and then increases the pitch of the blade to a second pitch greater than the first pitch, wherein the second pitch facilitates stalling of an outer portion of the blade in a gust that increases an angle of attack thereof;
wherein the adjustable lift regulating device comprises a leading edge shell comprising:
a bottom edge hinged to the blade below a leading edge of the blade; and
a top edge that controllably pivots forward and away from the blade to a position forward and above the leading edge of the blade.

6. A wind turbine comprising the apparatus of claim 5.

* * * * *